US009872485B2

(12) United States Patent
Blosch

(10) Patent No.: US 9,872,485 B2
(45) Date of Patent: Jan. 23, 2018

(54) BUMPER GUARD FOR FISHING REELS

(71) Applicant: Kirk Blosch, Salt Lake City, UT (US)

(72) Inventor: Kirk Blosch, Salt Lake City, UT (US)

(*) Notice: Subject to any disclaimer, the term of this patent is extended or adjusted under 35 U.S.C. 154(b) by 433 days.

(21) Appl. No.: 14/662,023

(22) Filed: Mar. 18, 2015

(65) Prior Publication Data
US 2015/0272103 A1 Oct. 1, 2015

Related U.S. Application Data

(60) Provisional application No. 61/967,775, filed on Mar. 27, 2014.

(51) Int. Cl.
*A01K 89/01* (2006.01)
*A01K 89/015* (2006.01)
*A01K 89/016* (2006.01)

(52) U.S. Cl.
CPC ........ *A01K 89/0192* (2015.05); *A01K 89/016* (2013.01); *A01K 89/01121* (2015.05); *Y10T 29/49826* (2015.01)

(58) Field of Classification Search
CPC .......... A01K 89/0192; A01K 89/01121; A01K 89/016
See application file for complete search history.

(56) References Cited

U.S. PATENT DOCUMENTS

| | | | | |
|---|---|---|---|---|
| 1,815,382 A * | 7/1931 | Russell | ................ | A01K 89/016 242/307 |
| 1,861,819 A * | 6/1932 | Russell | ................ | A01K 89/016 242/157 R |
| 3,641,707 A * | 2/1972 | Kellos | ..................... | B60J 10/80 49/462 |
| 4,876,819 A * | 10/1989 | Clifford | ................. | A01K 89/00 43/26 |
| 5,720,441 A * | 2/1998 | Chamberlin | ....... | A01K 89/0111 242/292 |
| 6,032,896 A * | 3/2000 | Liu | ...................... | G01B 3/1005 242/379 |
| 6,458,448 B1 * | 10/2002 | Hunt | .................... | B65D 81/054 206/398 |
| 6,467,612 B1 * | 10/2002 | Rosenfeld | ........ | A61B 17/06123 206/63.3 |
| 7,306,100 B1 * | 12/2007 | Eslambolchi | .......... | B65D 85/04 206/398 |
| 8,225,929 B1 * | 7/2012 | Penkaty | .............. | B65D 81/053 206/398 |

* cited by examiner

*Primary Examiner* — Emmanuel M Marcelo
(74) *Attorney, Agent, or Firm* — Pate Peterson, PLLC; Brett Peterson

(57) ABSTRACT

A system and method for protecting a fishing reel is provided. The method may include selecting a fishing reel having a generally round spool with a hub and a flange, selecting a reel edge guard having an elongate outer circumferential surface and an elongate lateral surface attached together in an angular arrangement and formed into a generally circular shape, and attaching the reel edge guard to the fishing reel spool flange with a permanent adhesive such that the reel edge guard outer circumferential surface is disposed around an outer edge of the spool flange and such that the reel edge guard lateral surface is attached to a lateral face of the spool flange.

19 Claims, 10 Drawing Sheets

BUMPER GUARD FOR FISHING REELS

PRIORITY

The present application claims the benefit of U.S. Provisional Patent Application Ser. No. 61/967,775, filed Mar. 27, 2014, which is herein incorporated by reference in its entirety.

THE FIELD OF THE INVENTION

The present invention relates to fishing reels. In particular, examples of the present invention relate to a guard for a fishing reel which is used when a person is fishing with the fishing reel.

BACKGROUND

Fishing has widespread acceptance as a hobby. Persons interested in fishing are typically not adverse to new technology and will frequently purchase new fishing rods and reels as these are introduced. Often, aesthetics and design elegance are a significant factor in purchasing decisions and fishermen (understood to include both men and women) typically desire to maintain fishing equipment in factory condition as much as is possible.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

Figure 1:
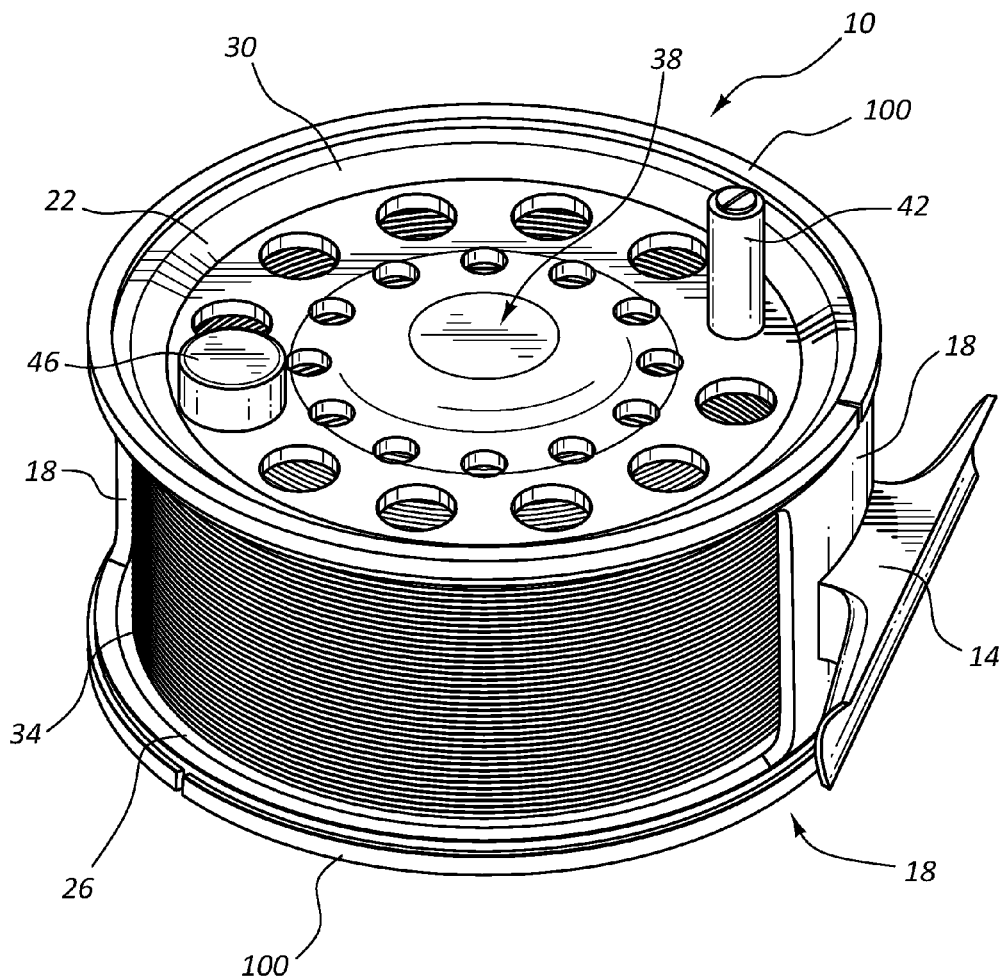
FIG. 1 is a drawing which shows a reel edge guard attached to a fishing reel.

Corresponding reference characters indicate corresponding components throughout the several views of the drawings. Skilled artisans will appreciate that elements in the figures are often illustrated for simplicity and clarity. While the figures have been drawn to scale, elements in some figures may be drawn to a different scale to provide an increased understanding of the invention. For example, the dimensions of some of the elements in the figures may be exaggerated relative to other elements to help to improve understanding of various examples of the present invention. Also, common but well-understood elements that are useful or necessary in a commercially feasible embodiment may not be depicted in all figures in order to facilitate a less obstructed view of these various embodiments of the present invention.

It will be appreciated that the drawings are illustrative and not limiting of the scope of the invention which is defined by the appended claims. The examples shown each accomplish various different advantages. It is appreciated that it is not possible to clearly show each element or advantage in a single figure, and as such, multiple figures are presented to separately illustrate the various details of the examples in greater clarity. Similarly, not every example need accomplish all advantages of the present disclosure.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

The disclosure particularly describes an edge guard for fishing reels. Particularly, the present disclosure describes an edge guard which may be installed onto the spool of a desired fishing reel and which is maintained on the fishing reel spool while the fishing reel is used for fishing.

As fishing has gained in popularity, fishing equipment has increased in technology and sophistication. Graphite fishing rods are common and fishing reels are equally sophisticated and aesthetically pleasing. Some fishermen will buy and sell equipment in an effort to find equipment which is best suited to their needs. Some fishermen will keep equipment for a long time and fishing equipment is often handed down as a gift or inheritance to younger fishermen. In either situation, the fishermen benefit from better preservation of fishing equipment.

Turning now to FIG. 1, a drawing of an edge guard 100 for fishing reels 10 is shown. The reel edge guard 100 is applied to the reel 10 during use of the reel. The reel edge guard 100 is designed to protect the reel 10 from incidental damage which may occur while using the reel for fishing. Fishing reels are typically a cylindrical device used in winding and stowing fishing line. Fishing reels provide the user the ability to cast the fishing line and control the feed of the line through the casting and retrieval process. Modern fishing reels usually have fittings aiding in casting for distance and accuracy, as well as retrieving the line.

Typical fishing reels include a foot 14 which is used to attach the fishing reel 10 to a fishing rod. The fishing reel foot 14 is typically attached to a frame 18. For the reel 10 shown (any many common fly fishing reels), the frame 18 extends across the back face of the fishing reel and adjacent the foot 14. The back face of the frame 18 is frequently round for the type of reel shown. An inner arbor (not shown) is typically attached to the center of the frame 18, and extends from the frame (upwardly in the view shown) into the center of the spool 22. The spool 22 includes an inner flange 26 (forming the inner face of the spool) and an outer flange 30 (forming the outer face of the spool and reel) which are connected together by a central hub (not shown).

The fishing line 34 is wound around the hub between the inner flange 26 and outer flange 30. The spool hub may include an outer arbor or bushing, indicated generally at 38, which interfaces with the inner arbor and allows the spool 22 to rotate about the inner arbor. The outer arbor/bushing 38 may include a rotational brake which allows a fisherman to adjust the drag which the reel applies when line is removed from the reel; causing the spool to rotate. A handle 42 is attached to the spool 22 and is used by a fisherman to turn the spool and wind the fishing line back onto the spool. The spool 22 may also include a counterweight 46 to balance the weight of the handle. The frame 18 and spool 22 are typically metal; often aluminum.

Many fishing reels 10 are an open design such as the reel 10 shown. By way of example, fly fishing reels are typically the design shown. Fly fishing reels are typically a single-action reel, normally operated by stripping line off the reel with one hand, while casting the rod with the other hand. The main purpose of a fly reel is to store line, provide smooth uninterrupted tension (drag) when a fish makes a long run, and counterbalance the weight of your fly rod when casting. The fly reel 10 has a simple design with the spool 22 holding the line 34 by inner and outer flanges 26, 30 on both sides.

Using the fly fishing reel as an example, the reel edge guard 100 is attached to the reel spool 22; securing the edge guard 100 to the outer perimeter of the inner and outer flanges 26, 30. The edge guard 100 thus protects the sides of the flanges and provides protection to the reel without interfering with the use of the reel 10.

The inventor has discovered that reels such as fly fishing reels may often become damaged or worn during use. Fly fishing is often done from a boat, from a river bank, or while wading in the river. While fishing in a boat, it is not uncommon to bring more fishing rods than fishermen as different rods may have different line weights and may be set up to use different flys, etc. Unused fly rods are often set in the boat. The edges of the exposed spool may become scratched or dinged due to movement in the boat. While fishing from a river bank, the edges of fishing reel spools may become scratched or damaged while hiking between fishing spots or due to incidental contact with adjacent brush, trees, soil, or rocks. While wading into a stream to fish or retrieve a fish, a fisherman may slip or fall due to the moss which grows on the streambed. In this situation, fishing reels are often damaged. Fly fishing is done with the fishing rod held in the fisherman's dominant hand. Thus, when a fisherman slips, they will typically try to catch them self with the hand holding the fishing rod. This often causes the fishing rod to contact the ground or riverbed and often causes damage to the reel. Damage to the spool 22 is of particular concern as scratches in the edges of the spool flanges 26, 30 may catch the fishing line and cut or damage the fishing line. The reel edge guard 100 protects the spool and fishing reel from damage due to incidental contact with other objects.

The reel edge guard 100 is usable with many types of fishing reels. The following paragraphs give non-exhaustive examples of suitable fishing reels. The centrepin reel is one which runs freely enough on its axle, the centrepin, to permit distance casting by allowing the line to be drawn off by the momentum of the cast from the rotating reel. The centrepin reel uses a large diameter spool typically mounted to a 12-17 foot surfcasting rod. A bracket is often attached to the reel to allow the reel to be rotated to place the spool axis (the centrepin) perpendicular to the rod for casting and returned to a position with the spool in plane with the rod to retrieve the line. In the casting position the spool is perpendicular to the rod; opening the face of the reel and allowing the line to run off the side of the spool when released in the cast. Similar to the fly reel, the centrepin reel has a large spool with a hub that is surrounded by two flanges that provide protection for the spool and the fishing line. As with any reel, nicks or damage to the spool area or its encasings can result in damage to the fishing line. Fishing line is often sized according to the size of fish expected to be caught and line damage can result in a broken line and loss of the fish when a fish is hooked.

A baitcasting, conventional, or revolving spool reel is a multiplying reel in which line is stored on a bearing-supporting a revolving spool. The bait casting reel is mounted above the rod. Two variations of the revolving spool bait casting reel are the conventional surf fishing reel and the big game reel. These are very large and robust fishing reels designed and built for heavy saltwater species such as tuna, marlin, sailfish and sharks. Surf fishing reels are normally mounted to long, two-handed rods; these reels frequently omit level-wind and braking mechanisms in order to achieve extremely long casting distances. Big game reels are not designed for casting, but used for trolling or fishing set baits and lures; they are ideal for fighting large and heavy fish off a pier or boat. These reels normally use sophisticated star or lever drags in order to play out huge saltwater gamefish. With the gears involved, these reels are relatively expensive. As with any fishing reel the spool area is encased by outside metal or stainless steel parts offering protection for the spool and, in the case of a baitcasting reel, the internal gear systems. Providing protection for the internal spool and gears becomes critical since damage to the outer case can result in damage to not only the lines but to the gears. The reel edge guard can be applied over this outer casing providing additional protection which can be easily replaced if damaged as opposed to the metal or stainless steel casing which can be costly to replace.

The conventional reel or trolling reel is similar to the baitcasting reel. There are typically two types of trolling reels, star drag reels and lever drag reels. Star drags are like baitcasters, but you move a little lever to put it into free spool. They have a star drag and you have to keep your thumb on them to keep off backlash. They are designed for trolling but can also be used for butterfly jigging and deep drop from a boat where you may be fishing along the bottom of the water. The functionality and overall structure is similar to the baitcasting.

With These and other reels, protecting the spool and the fishing line becomes paramount as it directly affects the operation of the reel. Use of the reel edge guard 100 over the outer edges of the spool flanges 26, 30 prevents damage to spool if the reel comes into contact a foreign object. The line is protected from dings or other damage which could result in damage to the line and line breakage.

Fishing reels can take substantial abuse and are often dropped or banged around resulting in damage as minor as small indentations in the reel and loss of paint to deep cuts or scratches or more serious structural damage which can make the reel unusable. The reel edge guard 100 provides a layer of protection to the reel and largely prevents dings and dents which can result in both cosmetic and functional damage to the reel. Many reels such as fly fishing and deep sea fishing reels can cost between hundreds and thousands of dollars and it is thus important to protect such reels. With the reel guard, the real has an extra layer of protection to help avoid dings and breakage.

Figure 2:
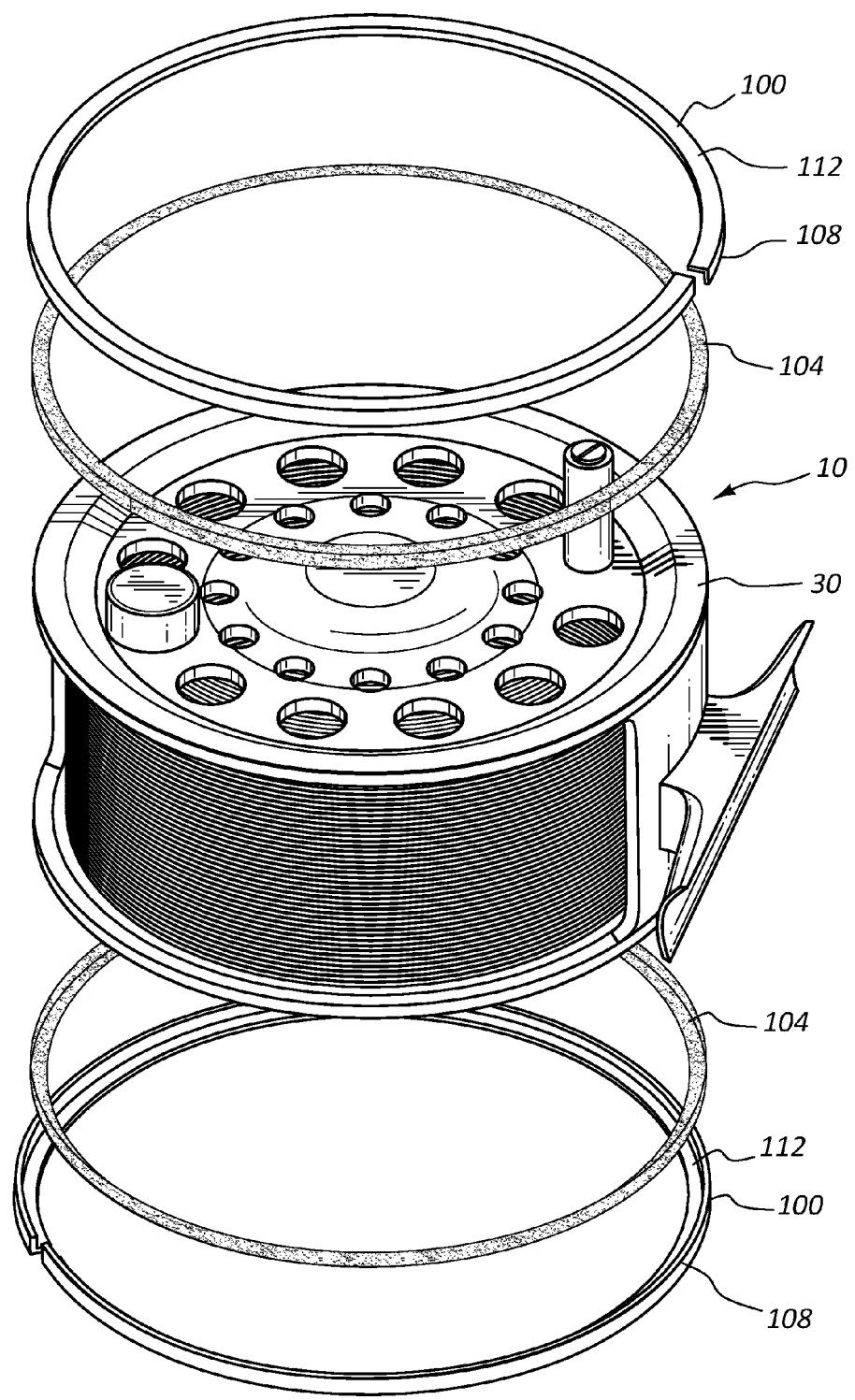
FIG. 2 is a drawing showing the various parts of the reel edge guard.

Referring now to FIG. 2, a drawing of the reel 10 is shown with the reel edge guard 100 in exploded view. The edge guard 100 is a preformed concave/round/circular guard. In one example, the edge guard is made from a thermoplastic and can be molded or extruded into the circular shape shown. Through careful manufacture of an extrusion die and careful manipulation of the extruded plastic, the edge guard 100 can be extruded in a manner which gives the edge guard 100 the circular shape shown rather than creating a linear extrusion which must be held into a circular shape when applied to the reel. In some cases, heat can be used to change the diameter of the edge guard before application to a reel to better fit the desired reel. In another example, the reel edge guard 100 is made of metal and may be stamped or machined to the desired shape. The reel edge guard 100 includes an elongate outer circumferential surface 108 which, when installed onto a reel, extends around an outer circumferential surface/edge of a spool flange, for example. The reel edge guard 100 includes an elongate lateral surface 112 which, for many example edge guards, forms a generally planar surface due to the circular shape of the edge guard. When the reel edge guard 100 is installed onto a reel the lateral surface 112 extends over an outer portion of the face of the spool flange. The outer circumferential surface 108 is attached to the lateral surface 112 so that the two are disposed at an angle to each other; commonly at about a 90 degree angle. The outer circumferential surface 108 and the lateral surface 112 are both elongate and extend along the length/circumference of the reel edge guard 100.

A layer of adhesive 104 is used to secure the reel edge guard 100 to a fishing reel. The adhesive 104 may be a glue which is applied to the reel and edge guard during installation of the reel edge guard. The adhesive 104 may also be an adhesive which is pre-applied to the reel edge guard 100 such as a film adhesive (e.g. a pressure sensitive adhesive). In this example, the reel edge guard 100 may include a piece of release film to cover and protect the adhesive 104. The adhesive used to install the reel edge guard is typically a permanent adhesive. Permanent adhesive is used to designate an adhesive which has significant bonding power and is not easily removed from the reel 10 and reel edge guard 100. A permanent adhesive will often require solvent or mechanical work to remove adhesive from the reel 10 and/or edge guard 100. The permanent adhesive 100 ensures that the reel edge guard 100 remains attached to the reel 10 during use of the reel. The reel edge guard 100 may be removed and replaced after a period of significant use, but will not easily detach during use. Replacement of the reel edge guard 100 may be required after the reel edge guard 100 has become damaged. In this situation, the reel 10 is protected from damage by the reel edge guard 100.

Figure 10:
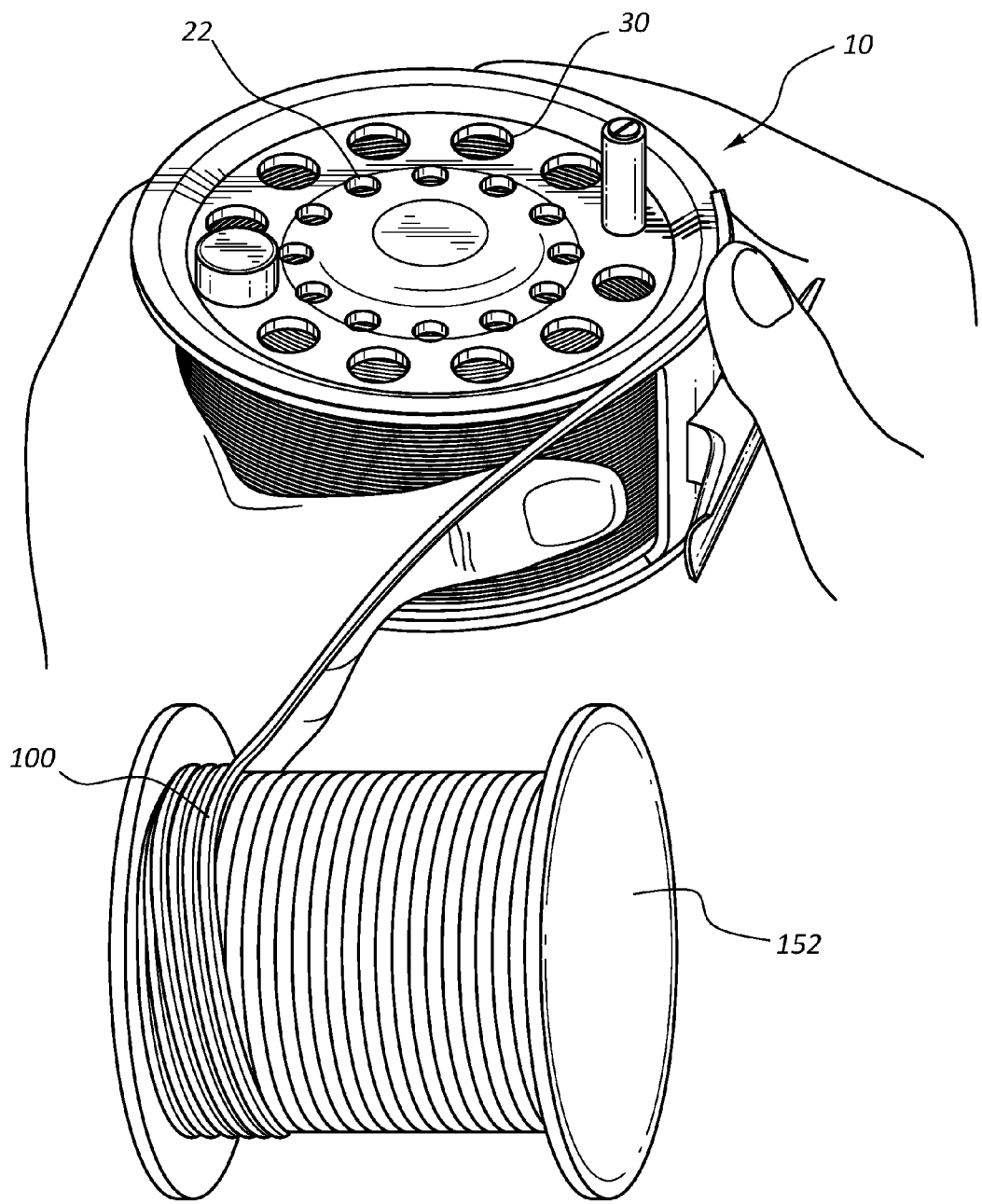
FIG. 10 is a drawing showing installation of the reel edge guard onto a fishing reel.

The reel edge guard 100 is simple to apply to many reels 10 and, when applied, provides an outer layer of protection to the reel without affecting the reel's functionality. It protects the reel while the reel is in use fishing. Many fishing reels 10 are manufactured with a common spool size. Thus, reel edge guards 100 may be manufactured in several sizes and in unbroken circles (without a break as shown in FIG. 2). These reel edge guards 100 may fit many available reels. Reel edge guards 100 may be manufactured in specific sizes to fit particular popular models of fishing reels 10. The reel edge guard 100 may also be provided in a spool with a longer continuous length as shown in FIG. 10.

Figure 3:
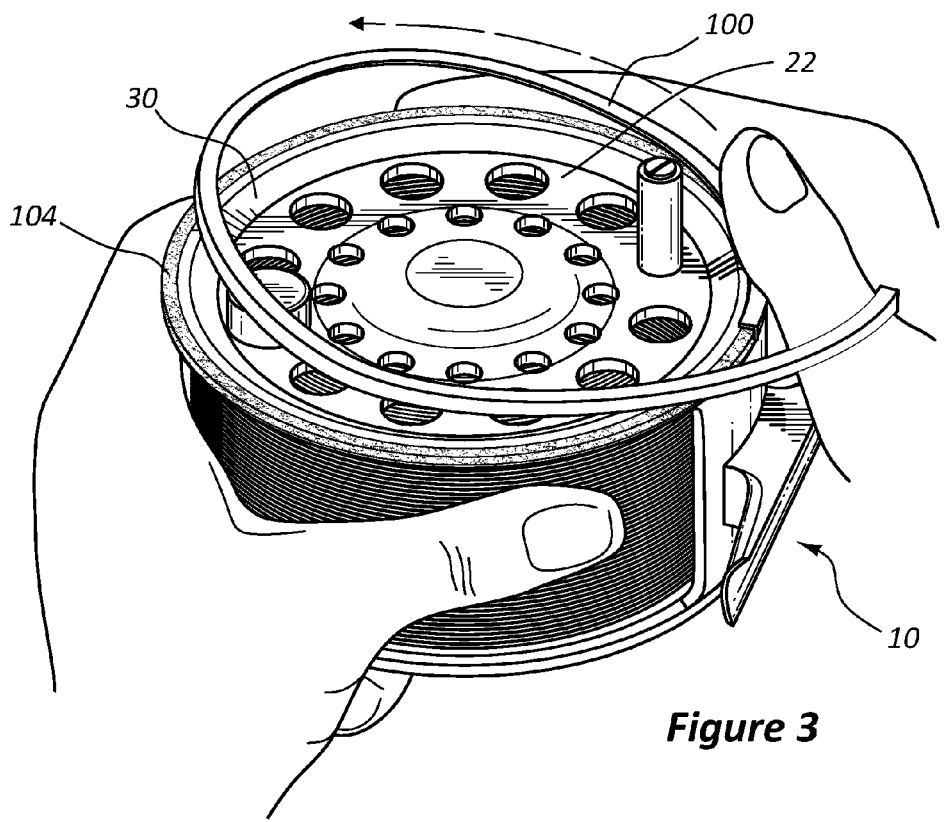
FIGS. 3 through 5 are drawings showing the fishing reel and fishing reel edge guard.

Referring now to FIG. 3, a reel edge guard 100 may be attached to an edge of a reel spool 22 such as the outer flange 30 which is shown. If the reel edge guard 100 is a generic fitment, the size of the reel edge guard 100 may be compared to the desired installed location on the reel and the reel edge guard 100 may be trimmed to fit the reel. Typically, the reel edge guard 100 is installed to leave little if any gap (116, FIG. 4) once installed. Once the reel edge guard 100 has been fitted to the reel 10, the adhesive 104 may be applied to the reel if the adhesive 104 is a separate strip of pressure sensitive adhesive or a glue. In this example, the adhesive 104 is applied to an edge of the spool outer flange 30 as is shown. If the adhesive 104 is already applied to the edge guard 100, this step may be omitted. The reel edge guard 100 may then be applied to the fishing reel 10. Typically, one end of the reel edge guard 100 is first applied to the reel and the edge guard is then applied in a circular motion progressing around the reel. Some adhesives 104 will bond quickly and require pressure to form a good bond while other adhesives may require that the edge guard is held in place for a curing period.

Figure 4:
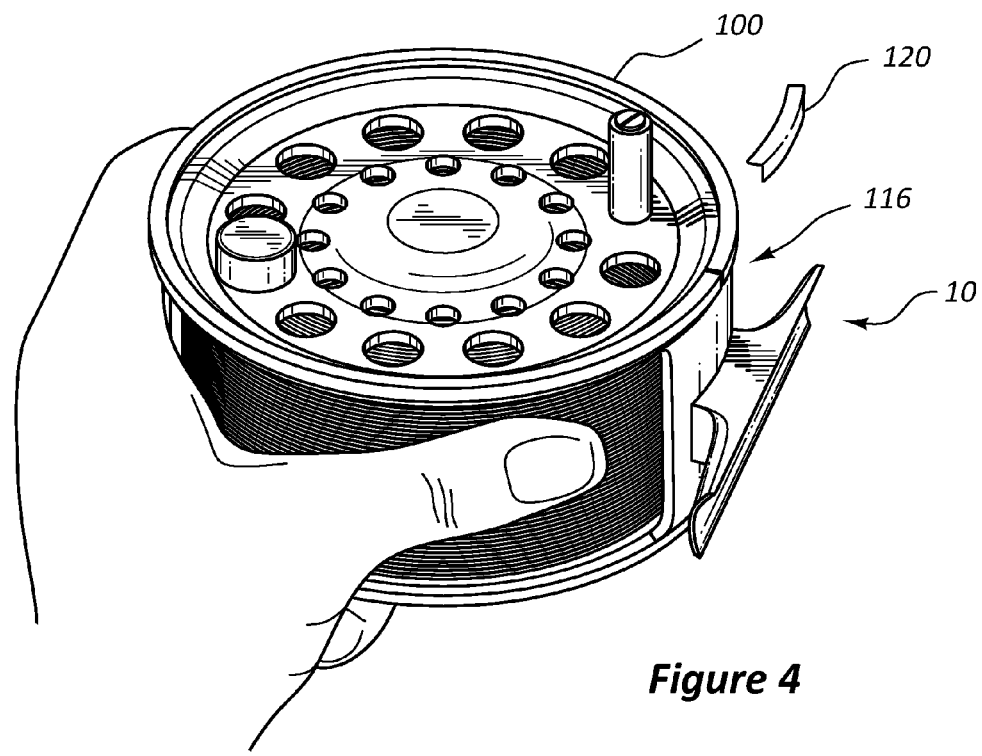

FIG. 4 shows an installed reel edge guard 100. As can be seen, trim to fit reel edge guards 100 leave a small joint 116. If installed properly, the two ends of the reel edge guard 100 meet and contact each other without preventing the reel edge guard 100 from completely contacting the adhesive 104 and the joint 116 is immaterial. If necessary, a small cover such as a piece of tape 120 may be applied over any joint 116 which is deemed to be objectionable.

Figure 5:
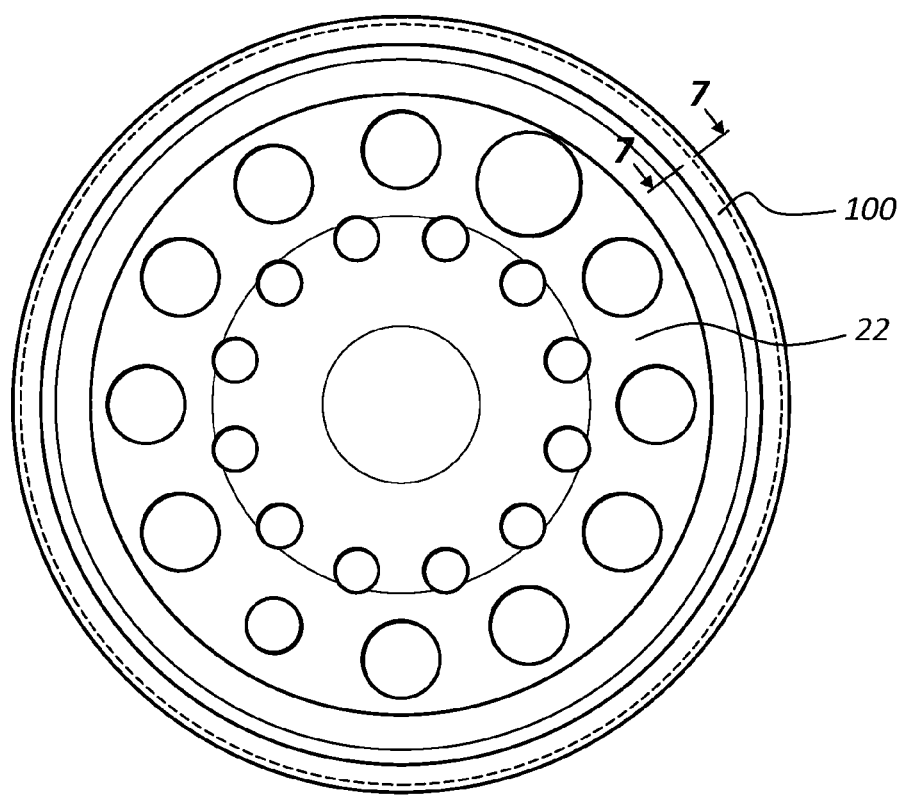
Figure 6:
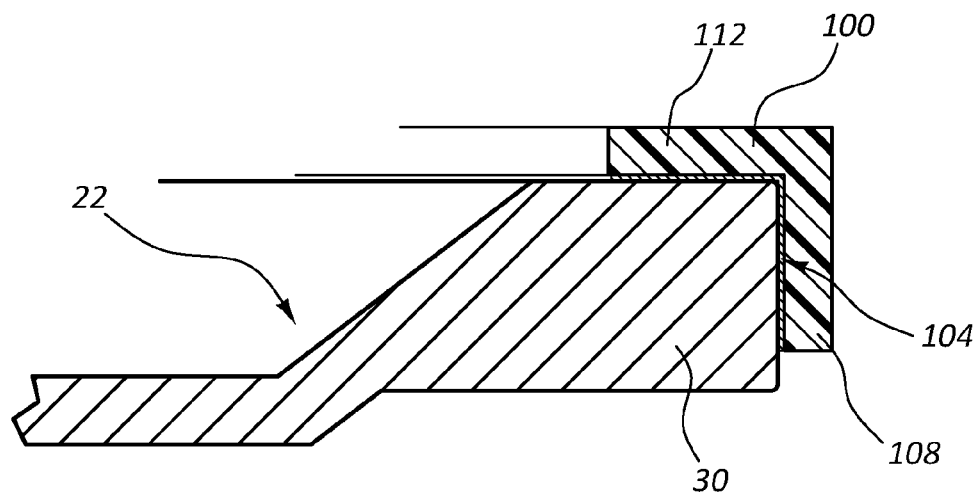
FIGS. 6 through 9 are drawings showing the reel edge guard.

FIG. 5 shows a drawing of a reel edge guard 100 installed onto a reel spool 22. Section line 1-1 indicates an example cross section which is illustrated in FIG. 6, FIGS. 7A through 7I, and FIGS. 8A through 8C. As shown in FIG. 6, the reel edge guard 100 has been attached to the outer edge of the spool outer flange 30 with adhesive 104. As discussed, the reel edge guard 100 typically includes an outer circumferential surface 108 which covers an outer circumferential edge of the spool flange 30. The reel edge guard 100 also typically includes a lateral surface 112 which covers a portion of the generally planar face formed around the edge of the outer flange 30.

Figure 7A:
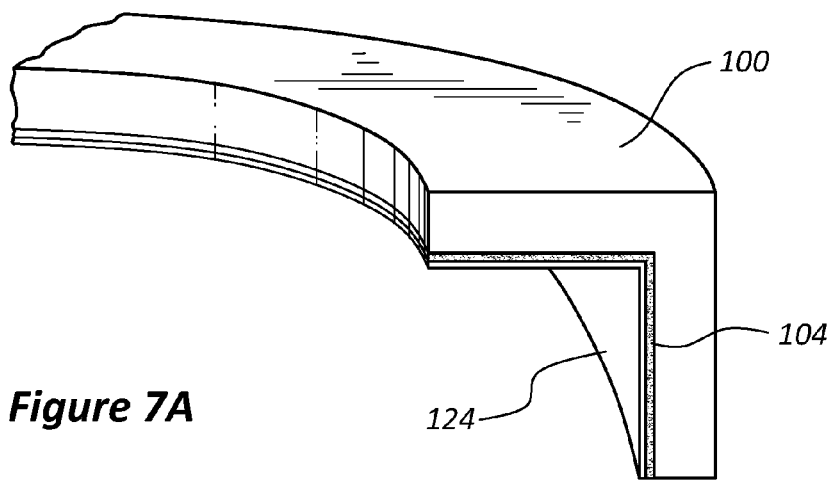
Figure 7B:
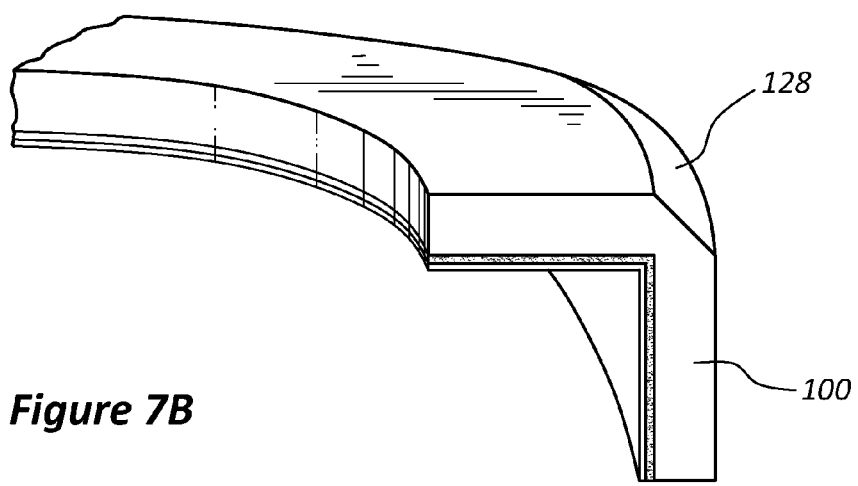
Figure 7C:
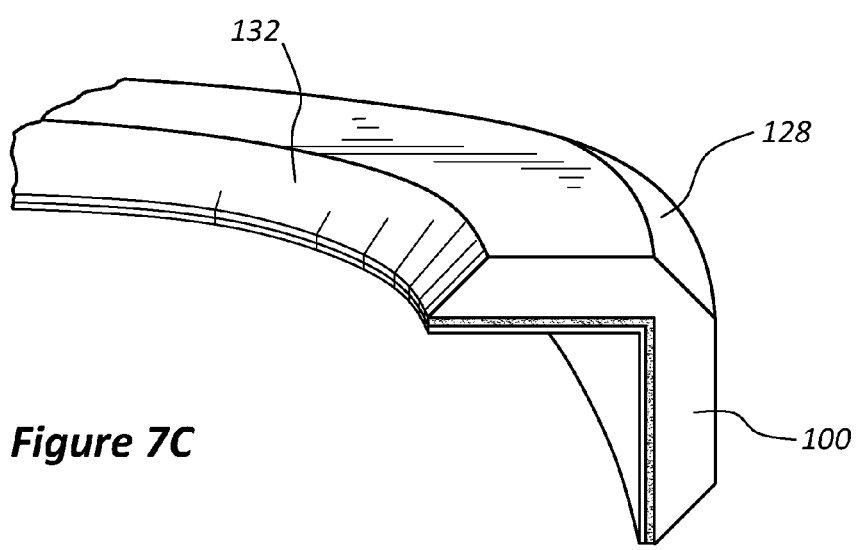
Figure 7D:
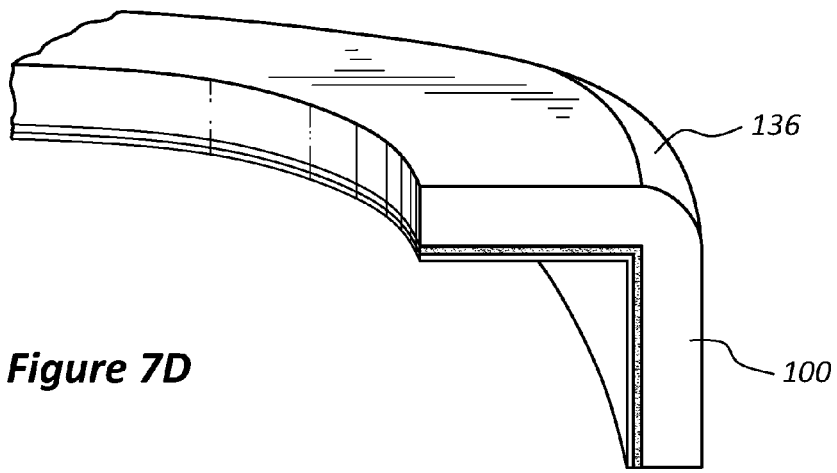
Figure 7E:
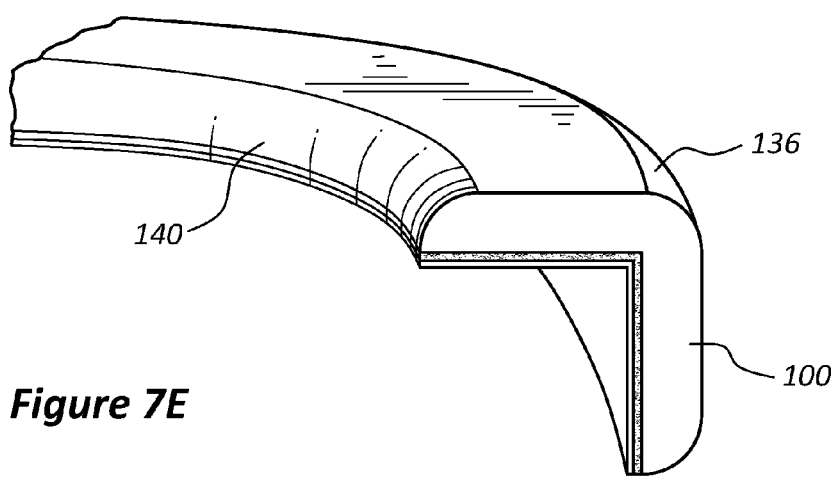
Figure 7F:
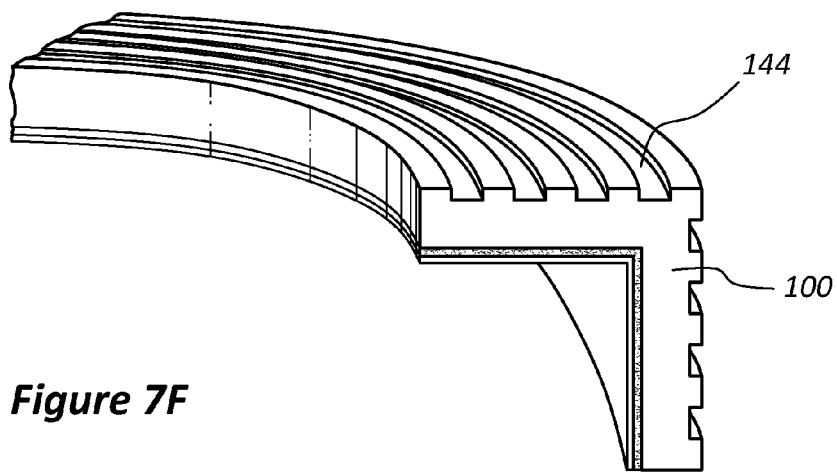
Figure 7G:
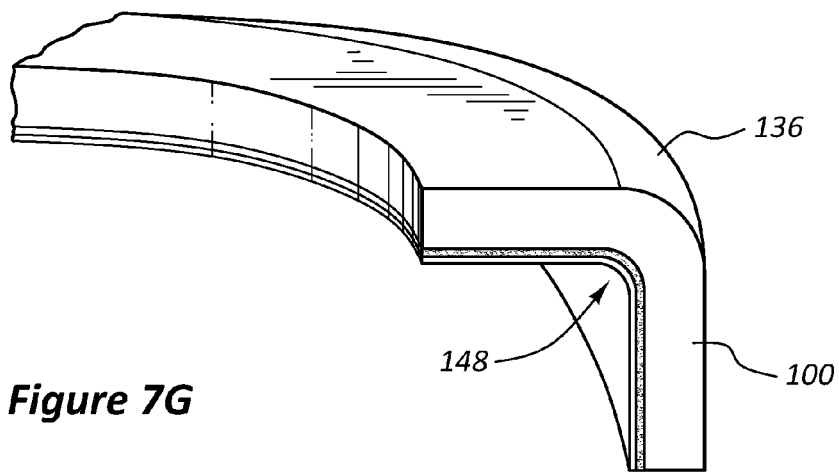
Figure 7H:
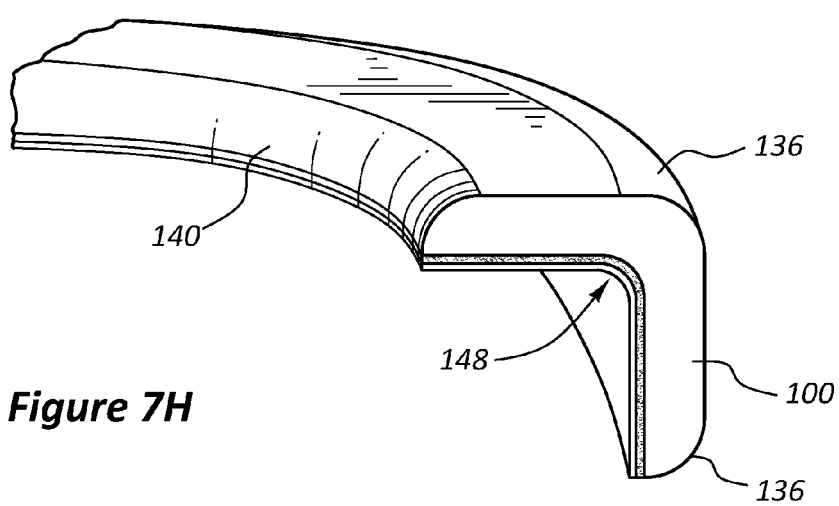
Figure 7I:
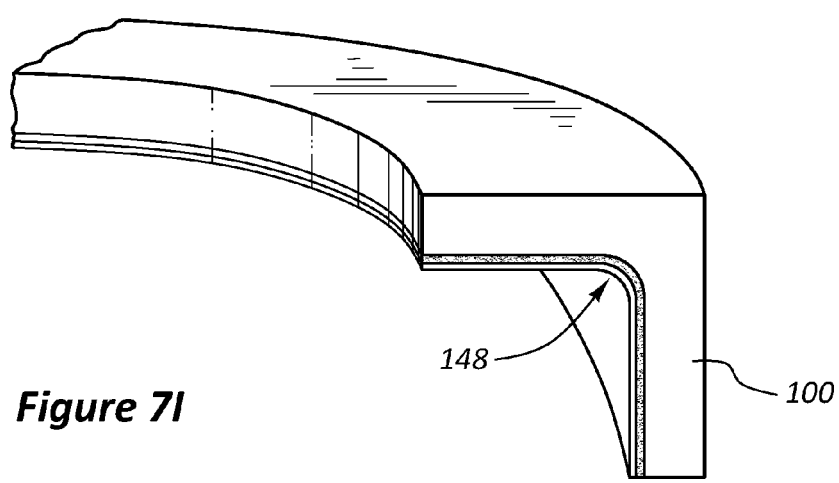

FIGS. 7A through 7I illustrate example shapes for the reel edge guard 100. These figures illustrate a reel edge guard 100 which includes a pre-applied pressure sensitive adhesive 104 and a protective release film 124 such as a release paper. FIG. 7A shows a reel edge guard 100 which has generally flat and angular faces and edges when viewed in cross section. FIG. 7B shows a reel edge guard 100 which includes an outer chamfer 128 formed on its outer corner. FIG. 7C shows a reel edge guard 100 which includes an outer chamfer 128 formed on its outer corner and an inner chamfer 132 formed on its inner corner. FIG. 7D shows a reel edge guard 100 which includes an outer radius 136 formed on its outer corner. FIG. 7E shows a reel edge guard 100 which includes an outer radius formed on its outer corner and an inner radius 140 formed on its inner corner. FIG. 7F shows a reel edge guard 100 which is formed with decorative grooves 144. FIG. 7G shows a reel edge guard 100 which includes an outer radius 136 and also includes an internal radius 148 which may allow the edge guard 100 to better fit reels with radiused corners. FIG. 7H shows a reel edge guard 100 which includes outer radii 136, inner radius 140, and an internal radius 148. FIG. 7I shows another reel edge guard 100 with an internal radius 148.

Figure 8A:
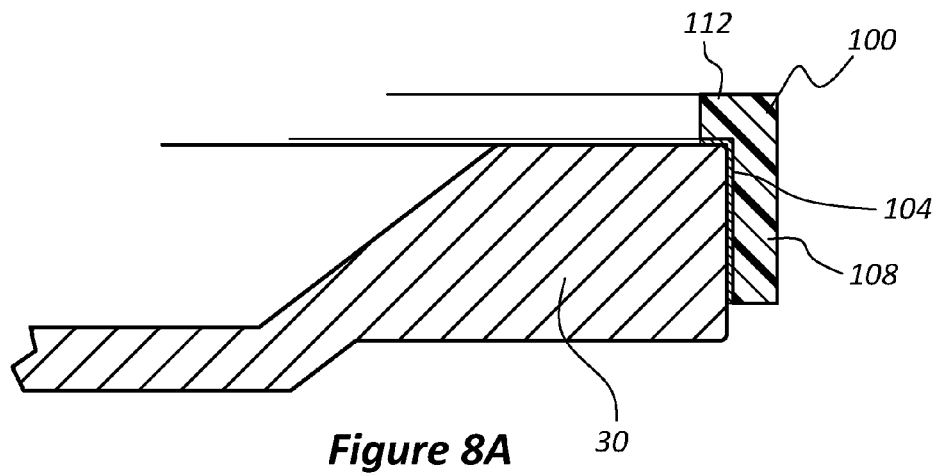
Figure 8B:
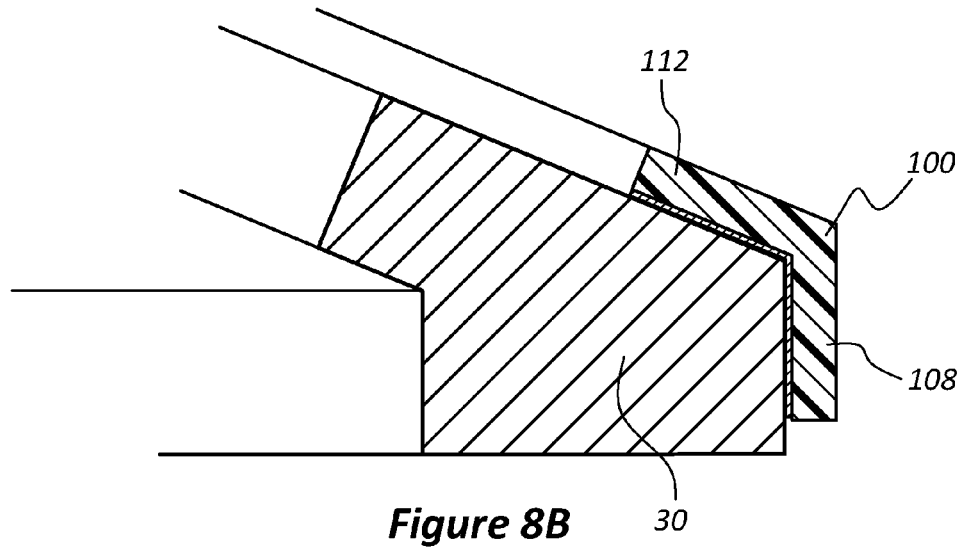
Figure 8C:
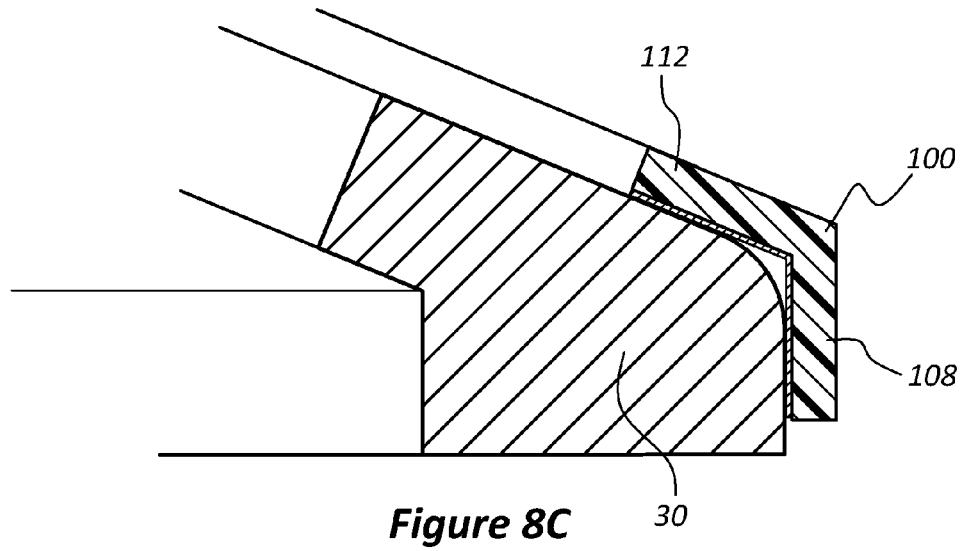

FIGS. 8A through 8C show how the relative sizes of the edge guard outer circumferential surface 108 and lateral surface 112 as well as the angle between the outer circumferential surface 108 and lateral surface 112 may be varied to fit different reel designs. While the reel edge guard may be bent to accommodate non-standard reels, it is desirable to minimize this as such deformation may encourage delamination of the reel edge guard 100 from the reel 10. As is illustrated in FIG. 8C, a reel edge guard 100 may be applied to a reel (e.g. outer flange 30) where there is a slight mismatch between the radius on the flange and the internal radius 148 (is used). The reel edge guards 100 may have a right hand and left hand design in order to fit two different edge designs of a particular reel 10.

Figure 9:
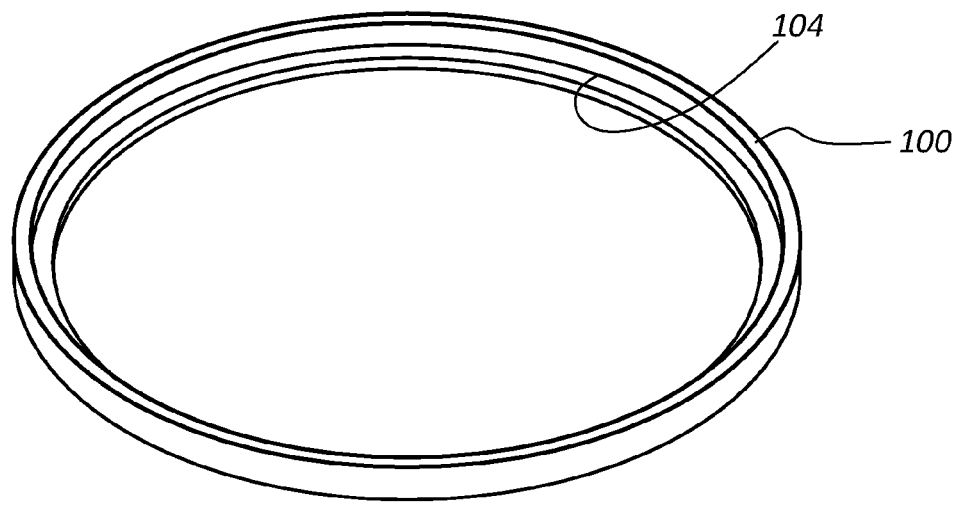

FIG. 9 shows a reel edge guard 100 which has been formed in a particular size to fit a predetermined reel or to fit a number of reels having a common size. As manufacturers will often make multiple reels with spools of a single size, it is possible to form a single edge guard 100 to fit multiple reels 10.

FIG. 10 shows a spool 152 with a longer continuous length of reel edge guard 100 which may be cut and applied to a reel 10 as needed. As discussed above, the reel edge guard 100 may be formed so that the continuous bulk length of reel edge guard 100 has a curve to it to naturally fit a reel without significant bending around the reel; lowering the residual stress present in the applied reel edge guard.

Figure 11:
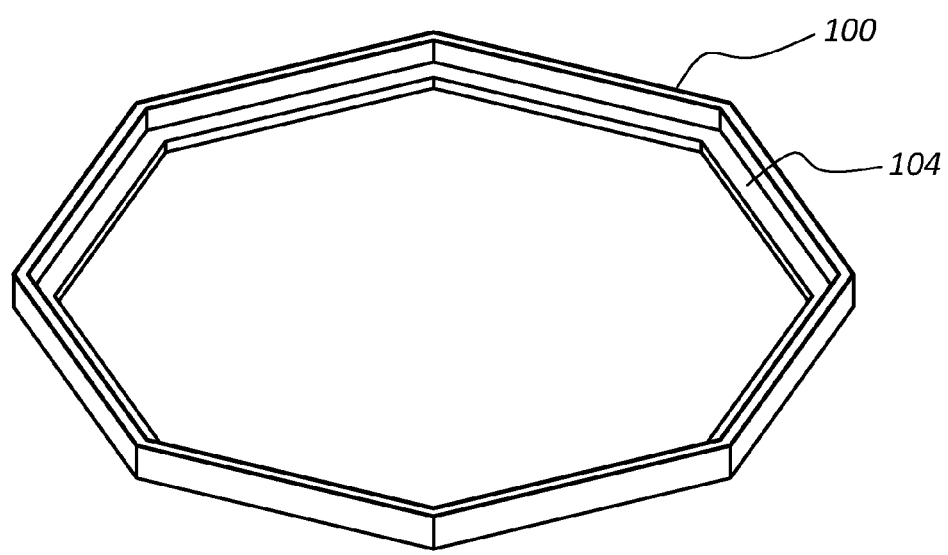
FIG. 11 is a drawing showing the reel edge guard.

FIG. 11 shows a reel edge guard 100 which has been formed in a polygonal shape which is closed and which follows a generally circular path. Some reels 10 are formed with a non-circular frame, etc. and a reel edge guard 100 may be made in a custom shape to fit such a reel if desired.

The above description of illustrated examples of the present invention, including what is described in the Abstract, are not intended to be exhaustive or to be limitation to the precise forms disclosed. While specific examples of the invention are described herein for illustrative purposes, various equivalent modifications are possible without departing from the broader scope of the present claims. Indeed, it is appreciated that specific example dimensions, materials, etc., are provided for explanation purposes and that other values may also be employed in other examples in accordance with the teachings of the present invention.

What is claimed is:

1. A method for protecting a fishing reel comprising:
   selecting a fishing reel having a generally round spool, the generally round spool having a hub and a flange;
   selecting a reel edge guard having an elongate outer circumferential surface and an elongate lateral surface attached together in an angular arrangement and formed into a generally circular shape;
   attaching the reel edge guard to the fishing reel spool flange with a permanent adhesive such that the reel edge guard outer circumferential surface is disposed around an outer edge of the spool flange and such that the reel edge guard lateral surface is attached to a lateral face of the spool flange.

2. The method of claim 1, wherein the reel edge guard is formed into a continuous circular shape.

3. The method of claim 1, wherein the reel edge guard is formed into an elongate length and wherein the method comprises cutting a desired length of the reel edge guard to fit a desired reel.

4. The method of claim 3, wherein the reel edge guard comprises a curvature which generally matches the curvature of the fishing reel spool independent of attachment to the fishing reel spool.

5. The method of claim 1, wherein the method comprises attaching the reel edge guard after manufacture of the fishing reel.

6. The method of claim 1, wherein the method comprises attaching the reel edge guard after purchase of the fishing reel.

7. The method of claim 1, wherein the method comprises using the fishing reel for fishing while the reel edge guard is attached to the fishing reel.

8. A method for protecting a fishing reel comprising:
   selecting a fishing reel which has completed manufacture, the fishing reel having a frame and a spool rotatably attached to the frame for holding fishing line;
   selecting a reel edge guard having an elongate surface;
   attaching the reel edge guard to the fishing reel with a permanent adhesive such that the reel edge guard is disposed around the fishing reel.

9. The method of claim 8, wherein the method comprises using the fishing reel for fishing while the reel edge guard is attached to the fishing reel.

10. The method of claim 8, wherein the method comprises attaching the reel edge guard to an outer circumferential edge of the spool.

11. The method of claim 8, wherein the reel edge guard comprises an elongate outer circumferential surface and an elongate lateral surface attached together, and wherein the method comprises attaching the reel edge guard to the spool such that the outer circumferential surface is attached to an outer edge of a spool flange and such that the lateral surface is attached to a lateral face of the spool flange.

12. The method of claim 11, wherein the elongate outer circumferential surface and the elongate lateral surface are attached together to form an elongate angle member.

13. The method of claim 8, wherein the reel edge guard comprises a curvature which generally matches a curvature of the fishing reel spool independent of attachment to the fishing reel spool.

14. The method of claim 8, wherein the reel edge guard is formed into a circular shape.

15. A system for protecting a fishing reel comprising:
   a fishing reel having a frame, a foot attached to the frame which is attachable to a fishing rod to attach the reel to the fishing rod, and a spool rotatably attached to the frame for holding fishing line, the spool having a hub and a flange;
   a reel edge guard having an elongate outer surface;
   wherein the reel edge guard is attached to the fishing reel with a permanent adhesive such that the reel edge guard outer surface is disposed around the reel in a generally circular orientation.

16. The system of claim 15, wherein the reel edge guard more specifically comprises an elongate outer circumferential surface and an elongate lateral surface attached together to form an elongate angle member.

17. The system of claim 16, wherein the reel edge guard is attached to the spool such that the outer circumferential surface is attached to an outer edge of the spool flange and such that the lateral surface is attached to a lateral face of the spool flange.

18. The system of claim 15, wherein the reel edge guard is manufactured to have a curvature which generally matches a curvature of the fishing reel spool independent of attachment to the fishing reel.

19. The system of claim 15, wherein the reel edge guard is manufactured to have a circular shape independent of attachment to the fishing reel.

* * * * *